US010712990B2

(12) United States Patent
Cash

(10) Patent No.: US 10,712,990 B2
(45) Date of Patent: Jul. 14, 2020

(54) SYSTEMS AND METHODS FOR A CUSTOMER ASSISTANCE STATION

(71) Applicant: AT&T Intellectual Property I, L.P., Atlanta, GA (US)

(72) Inventor: Duane Matthew Cash, McKinney, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 25 days.

(21) Appl. No.: 15/925,391

(22) Filed: Mar. 19, 2018

(65) Prior Publication Data

US 2019/0286403 A1    Sep. 19, 2019

(51) Int. Cl.
| | |
|---|---|
| *G06F 3/14* | (2006.01) |
| *G06F 3/0488* | (2013.01) |
| *G06F 3/01* | (2006.01) |
| *G06T 7/70* | (2017.01) |
| *G06Q 30/06* | (2012.01) |

(Continued)

(52) U.S. Cl.
CPC ............ *G06F 3/1423* (2013.01); *G06F 3/012* (2013.01); *G06F 3/017* (2013.01); *G06F 3/0488* (2013.01); *G06Q 30/0617* (2013.01); *G06T 7/70* (2017.01); *G03H 1/268* (2013.01); *G06F 3/044* (2013.01); *G06T 13/40* (2013.01)

(58) Field of Classification Search
None
See application file for complete search history.

(56) References Cited

U.S. PATENT DOCUMENTS

| | | |
|---|---|---|
| 5,023,725 A | 6/1991 | McCutchen et al. |
| 7,013,435 B2 | 3/2006 | Gallo et al. |

(Continued)

FOREIGN PATENT DOCUMENTS

| | | |
|---|---|---|
| GB | 2404449 A | 2/2005 |
| KR | 20140136288 A | 11/2014 |

(Continued)

OTHER PUBLICATIONS

"Touch and hand gesture-based interactions for directly manipulating 3D virtual objects in mobile augmented reality", Multimedia Tools and Applications 75.23, 2016, 16529-16550.

(Continued)

*Primary Examiner* — Nicholas J Lee
(74) *Attorney, Agent, or Firm* — Guntin & Gust, PLC; Matthew Tropper

(57) ABSTRACT

Aspects of the subject disclosure may include, for example, receiving first user input from a first user interface screen and second user input from a second user interface screen, wherein the first user interface screen is disposed at a first location on a support structure and the second user interface screen is disposed at a second location on the support structure; presenting a first series of images, wherein the first series of images is presented responsive to first user input, and wherein the first series of images is presented as a first projection in a first volume of space; and presenting a second series of images, wherein the second series of images is presented responsive to second user input, wherein the second series of images is presented as a second projection in a second volume of space. Other embodiments are disclosed.

20 Claims, 8 Drawing Sheets

(51) Int. Cl.
   *G03H 1/26* (2006.01)
   *G06T 13/40* (2011.01)
   *G06F 3/044* (2006.01)

(56) References Cited

U.S. PATENT DOCUMENTS

| | | | |
|---|---|---|---|
| 7,978,184 B2 | 7/2011 | Morrison et al. | |
| 9,557,855 B2 | 1/2017 | Lawrence et al. | |
| 9,753,547 B2 | 6/2017 | Liu et al. | |
| 9,830,044 B2 | 11/2017 | Brown et al. | |
| 9,848,169 B2 | 12/2017 | McNelly et al. | |
| 2007/0220444 A1* | 9/2007 | Sunday | G06F 3/0488 715/788 |
| 2009/0189917 A1* | 7/2009 | Benko | G06F 3/14 345/647 |
| 2014/0267599 A1 | 9/2014 | Drouin et al. | |
| 2015/0106739 A1* | 4/2015 | Tan | G06F 3/0484 715/750 |
| 2015/0142536 A1 | 5/2015 | Marlow et al. | |
| 2015/0286185 A1 | 10/2015 | Kim et al. | |
| 2016/0070356 A1 | 3/2016 | Aguirre et al. | |
| 2016/0085332 A1* | 3/2016 | Herrera-Morales | G02B 27/18 345/175 |
| 2016/0267577 A1 | 9/2016 | Crowder et al. | |
| 2017/0052507 A1 | 2/2017 | Poulos et al. | |
| 2017/0221504 A1 | 8/2017 | Rinker | |
| 2017/0308905 A1 | 10/2017 | Navaratnam | |
| 2017/0309074 A1 | 10/2017 | Cho et al. | |

FOREIGN PATENT DOCUMENTS

| | | |
|---|---|---|
| KR | 20160076568 A | 7/2016 |
| WO | 2001069349 | 9/2001 |
| WO | 2008152183 A1 | 12/2008 |
| WO | 2012131554 A2 | 10/2012 |
| WO | 2016162696 A1 | 10/2016 |
| WO | 2017017465 A1 | 2/2017 |

OTHER PUBLICATIONS

Elmorshidy, Ahmed, "Holographic projection technology: the world is changing", arXiv preprint arXiv:1006.0846, 2010.
Sarmah, Satta, "Smaller and Full of Holograms: The Storefront of Tomorrow", Fast Company, fastcompany.com, Feb. 20, 2015.

* cited by examiner

700

SYSTEMS AND METHODS FOR A CUSTOMER ASSISTANCE STATION

FIELD OF THE DISCLOSURE

The subject disclosure relates to systems and methods for a customer assistance station (e.g., a customer assistance station that is gesture-enabled and/or touch screen-enabled).

BACKGROUND

There exist various retail sales systems for providing interactive shopping via user interfaces. There also exist various retail display systems for providing communication with a remote sales agent.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for a customer assistance station (e.g., a customer assistance station that is gesture-enabled and/or touch screen-enabled). Other embodiments are described in the subject disclosure.

One or more aspects of the subject disclosure include a system for receiving input from a user (such as a shopper at a retail location). The input can be received from the shopper via a touch-screen interface and/or via a gesture interface (in various examples, the gestures can be detected by the system via still camera(s), video camera(s), or the like). In addition, projector(s) can be configured to provide to the shopper output in the form of a 3-D avatar or the like. The projector(s) can form the avatar by, for example, control of where the light patterns intersect, and/or control of light patterns reflecting off of air molecules, dust molecules, etc.

The avatar (which, in various examples, can be remotely operated by a human customer service representative, can be controlled via an "artificial intelligence" mechanism and/or can comprises pre-recorded responses to various user input) can be configured to answer questions of the shopper and/or provide suggestions for purchases. In one embodiment, instead of (or in addition to) the avatar, one or more items may be presented to the shopper via the projector(s). The avatar can function as a customer service representative and/or as a sales agent.

In one specific example, a geodesic sphere is provided with multiple user interfaces (e.g., multiple touch screen interfaces and/or multiple gesture interfaces), thus permitting simultaneous use by multiple shoppers.

Figure 1:
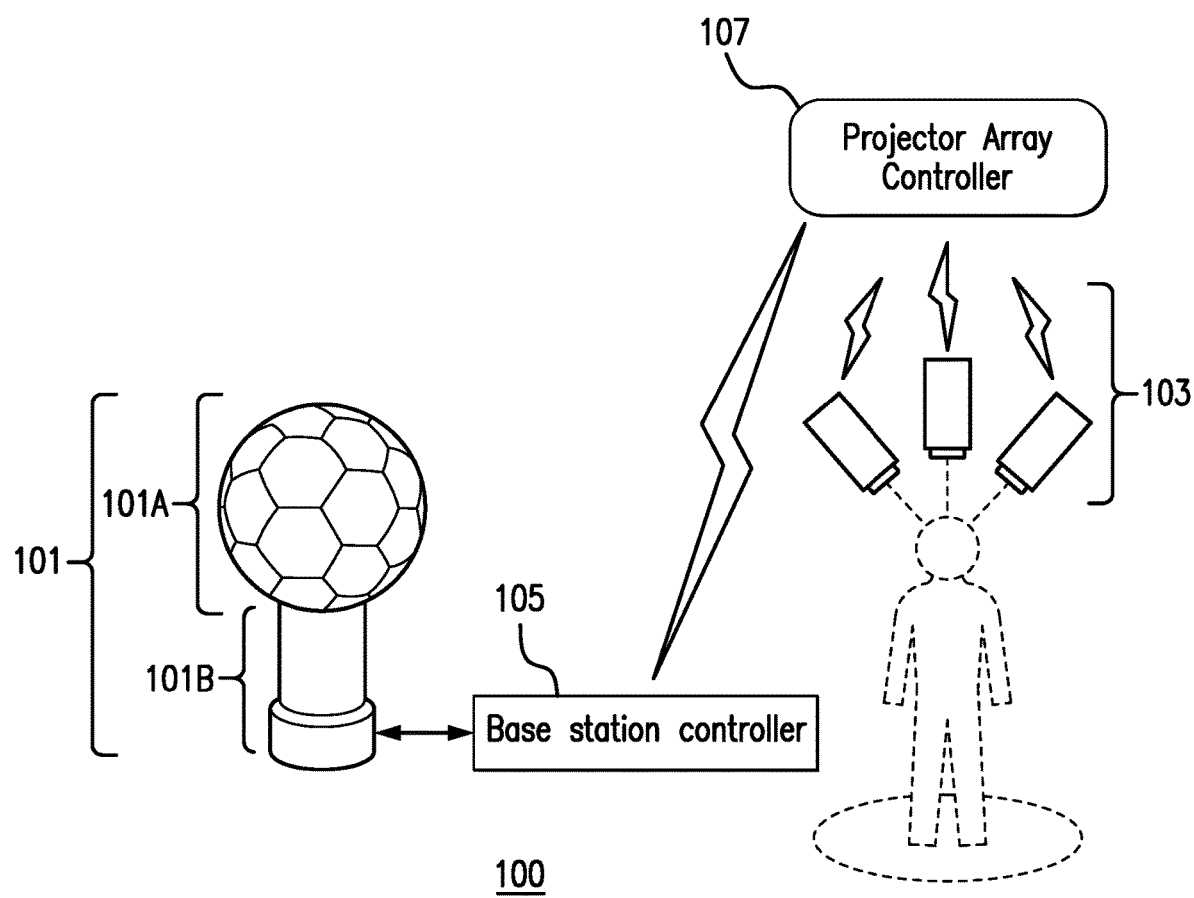
FIG. 1 depicts an illustrative embodiment of a system including a customer assistance station and associated projectors.

Referring now to FIG. 1, this FIG. depicts an illustrative embodiment of a system 100 including a customer assistance station 101 (sometimes referred to herein as a gesture-enabled spherical customer assistance station) and associated projectors 103 (which can comprise, for example, lasers and/or other types of light producing elements). The system 100 provides for interactive light projecting assistant interfaces for a retail environment. A geodesic sphere 101A is attached to a tubular apparatus 101B. The tubular apparatus 101B comprises a gateway controller (not shown) to control the flow of communications (e.g. digital communications) between components of the geodesic sphere (e.g., sensors of the geodesic sphere, user interfaces of the geodesic sphere, cameras of the geodesic sphere) and a base station controller 105. The gateway controller of the tubular apparatus is connected to the base station controller 105 via a wired and/or wireless communication path. The base station controller 105 comprises a computational control unit such as a microprocessor (not shown) and computer software algorithms (not shown) that are configured to send/receive inputs and outputs (e.g., commands) to/from the geodesic assistance station 101 to interface with the components (e.g., sensors, user interfaces, cameras) of the geodesic sphere 101A).

The geodesic sphere 101A comprises, in one example, hexagonal panels configured to resemble a spherical shape with the bottom panel attached to the tubular apparatus 101B. The customer assistance station 101 comprises gesture sensors to receive positional coordinates (e.g., x, y, and z positional coordinates) from, for example, the hands of a user. Each of the hexagonal panels in the geodesic sphere 101A can comprise a flat substrate layer that contains capacitive touch sensors to receive touch inputs from a respective user. A given hexagonal panel interface can activate upon one or more touches from a respective user. Once activated, a controller (not shown) within the geodesic sphere 101A can transmit a signal (e.g., a signal conveying data) to the gateway controller (not shown) in the tubular apparatus 101B, which will classify the signal according to the location of the particular hexagonal interface activated. The classified command will then be transmitted to the base station controller 105. The base station controller 105 will process the signal(s) that are transmitted thereto and, in turn, send signal(s) to a remote projector array controller 107 (e.g., through wireless communication.) The remote projector array controller 107 directs (i.e., controls) the projectors 103 (which can comprise, for example, a light projector array) to project visual content (e.g., to one or more surfaces and/or into one or more volumes of space). In one example, a software application drives the projectors 103 to map the visual content according to the shape of the targeted surface. The visual content can comprise, for example, imagery that creates a series of light patterns arranged to provide interactive visual feedback in response to sensor inputs from the user interfaces of the geodesic sphere 101A.

In one specific example, the hexagonal interface panels of the geodesic sphere 101A are framed by solid beams that are connected to a joint structure at the vertices of each panel. The connections of the beams and joints can be arranged in a manner which creates the spherical shape of the geodesic sphere 101A. Additional beams can be connected to a series of inward facing holes in the joints which allow several key beams within the housing to be arranged into a frame which can hold and support electronic devices within the structure of the geodesic sphere 101A. The use of beams and joints to connect and shape the housing within the sphere allow, in this example, the wiring to be inserted and routed through the tubular apparatus and connected to the base station controller 105.

In one specific example, the customer assistance station 101 sends output (e.g., data) that is directed to the projector array controller 107 (which can comprise a visual processing unit). The projector array controller 107 can be connected to the projectors 103 (which can transmit light pattern(s) that are mapped by a computer software program to illuminate one or more floor surfaces). This same projector array controller 107 (and/or another controller) can create a light reflection volume (e.g., whereby the projected light pattern(s) interact with a molecular cloud of atoms within the light reflection volume and result in a reflection of the beams within the vicinity of the cloud—making the light beams visual to human vision). In one example, the projection lights are aimed using varying angles to create intersecting light patterns which create visual forms representative of 3-dimensional holographic objects and/or 3-dimensional holographic persons when viewed by the human eye.

In one example, the hexagonal interfaces on the geodesic sphere 101A provide customers with a biometric login process (e.g., wherein each user can log into his or her account using a full hand scan on the surface of a respective hexagonal interface surface). Upon login by a customer at the gesture-enabled spherical customer assistance station, the system can display customer service options available to the customer according to various account profile capabilities/permission/data. The system can present each customer (e.g., on a respective user interface) with options for paying their bills, updating service plans, starting service plans, buying products from the store and/or reviewing products that are available within the store location. The system can send requests for assistance to a platform network in the cloud (which, in one example, can handle the transmission of payments and/or credits for products). In one example, the gesture-enabled spherical customer assistance station can also serve as a point-of-sale mechanism (e.g., by processing credit card and/or debit payments for products). The gesture-enabled spherical customer assistance station can enable the consumer to authorize payments for products using gestures in the air above (and/or adjacent to) the hexagonal interface panes on the geodesic sphere 101A. This can be accomplished, for example, via use at the geodesic sphere 101A of outward facing cameras housed therein (and/or thereon). Such cameras can provide, for example, streaming images. These streaming images can be sent, for example, to computer vision algorithms (e.g., that apply visual analytic filters). The hexagonal interface panels can, in one example, provide one-way transparency to allow the cameras to see the gestures originating from the customer outside of the geodesic sphere 101A. In this example, the customer will not be able to see the camera(s) affixed to the inner frame of the unit; the customer will only see the output (e.g., digital output) from the geodesic sphere 101A.

In one example, when the customer requires assistance, the projected avatar in the form of a light-reflected volume of space can provide visual animated sequences. The visual animated sequences can be, for example, pre-recorded. The visual animated sequences can provide, for example, managed guidance for customer service scenarios (such as problems with bill payments, technical assistance walk-throughs and help with frequently asked questions (e.g., related to products in the store)).

In one example, the projectors 103 (comprising, for example, a projector array) can comprise a number of projectors to increase resolution of the visual holographic elements on the floor of the showroom area and/or in one or more volumes of space. In one example, the projector array controller 107 can be configured with one or more computer software programs that will drive the projectors 103 to present the holographic elements on the floor of the showroom area and/or be illuminated in one or more volumes of space in the showroom area.

Figure 2:
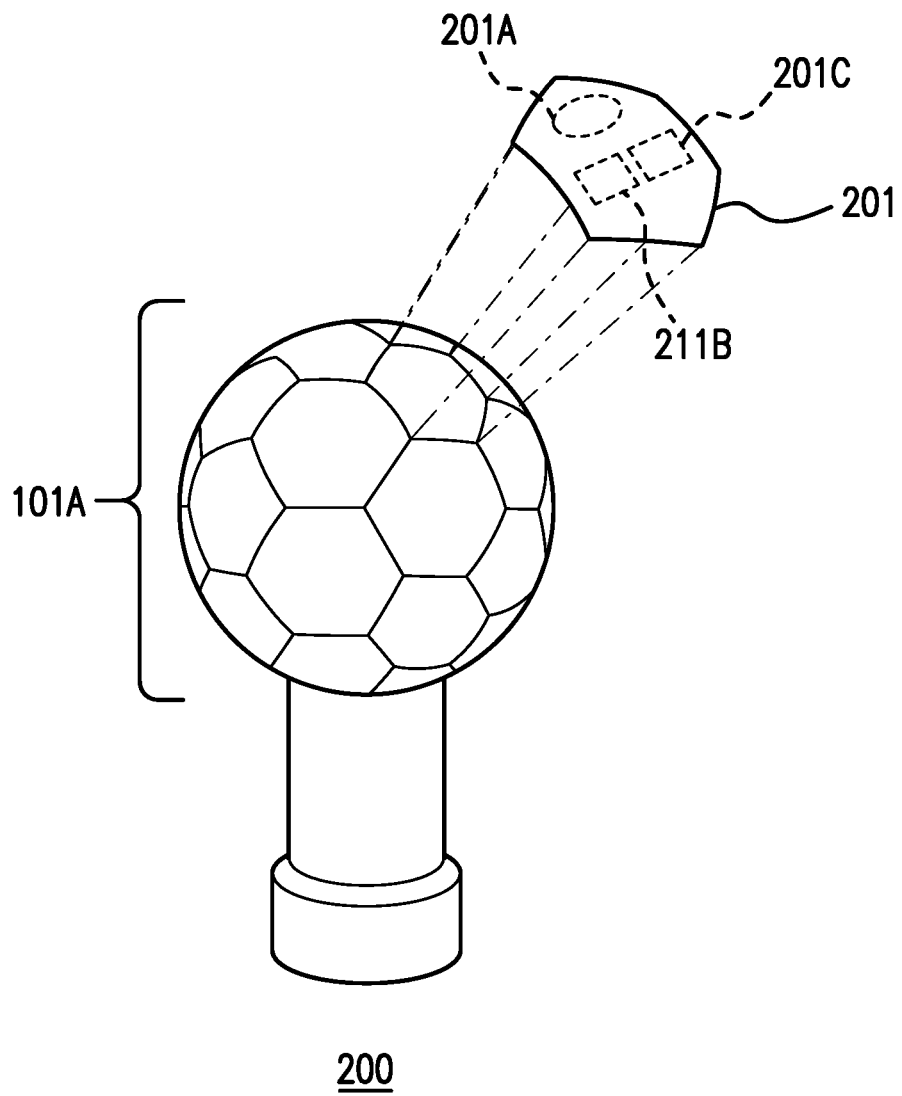
FIG. 2 depicts certain details of the customer assistance station of FIG. 1.

Referring now to FIG. 2, this FIG. depicts certain details of the customer assistance station of FIG. 1. In particular, an example touch-enabled user interface screen 201 of geodesic sphere 101A is shown (in this view, the screen 201 is not projected into space but, rather, is shown as a more detailed element of an interface screen of geodesic sphere 101A). The touch-enabled user interface screen 201 can provide various graphical user interface elements 201A, 201B, 201C (while this example shows three graphical user interface elements, any desired number of graphical user interface elements can be used).

Figure 3:
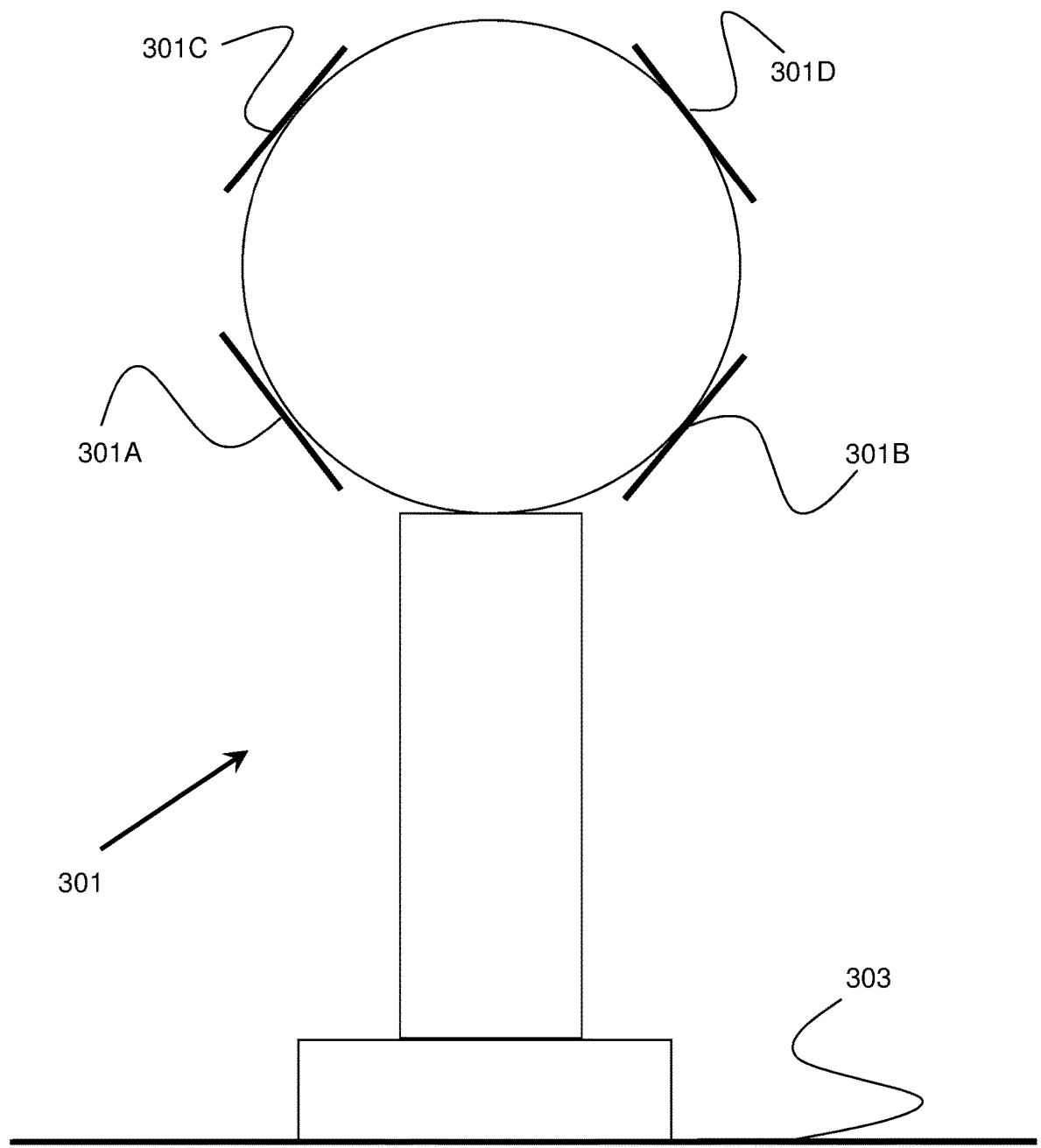
FIG. 3 depicts an illustrative embodiment of a customer assistance station (this FIG. shows a simplified side view of the customer assistance station)

Referring now to FIG. 3, this FIG. depicts an illustrative embodiment of a customer assistance station 301 (this FIG. shows a simplified side view of the customer assistance station 301). As seen, example user interface screens 301A, 301B are at a first height above the floor 303 and example user interface screens 301C, 301D are at a second (different) height above the floor 303. In addition, each of example user interface screens 301A, 301B, 303C, 303D are disposed at different angles relative to a horizontal reference (e.g., the floor 303).

Figure 4:
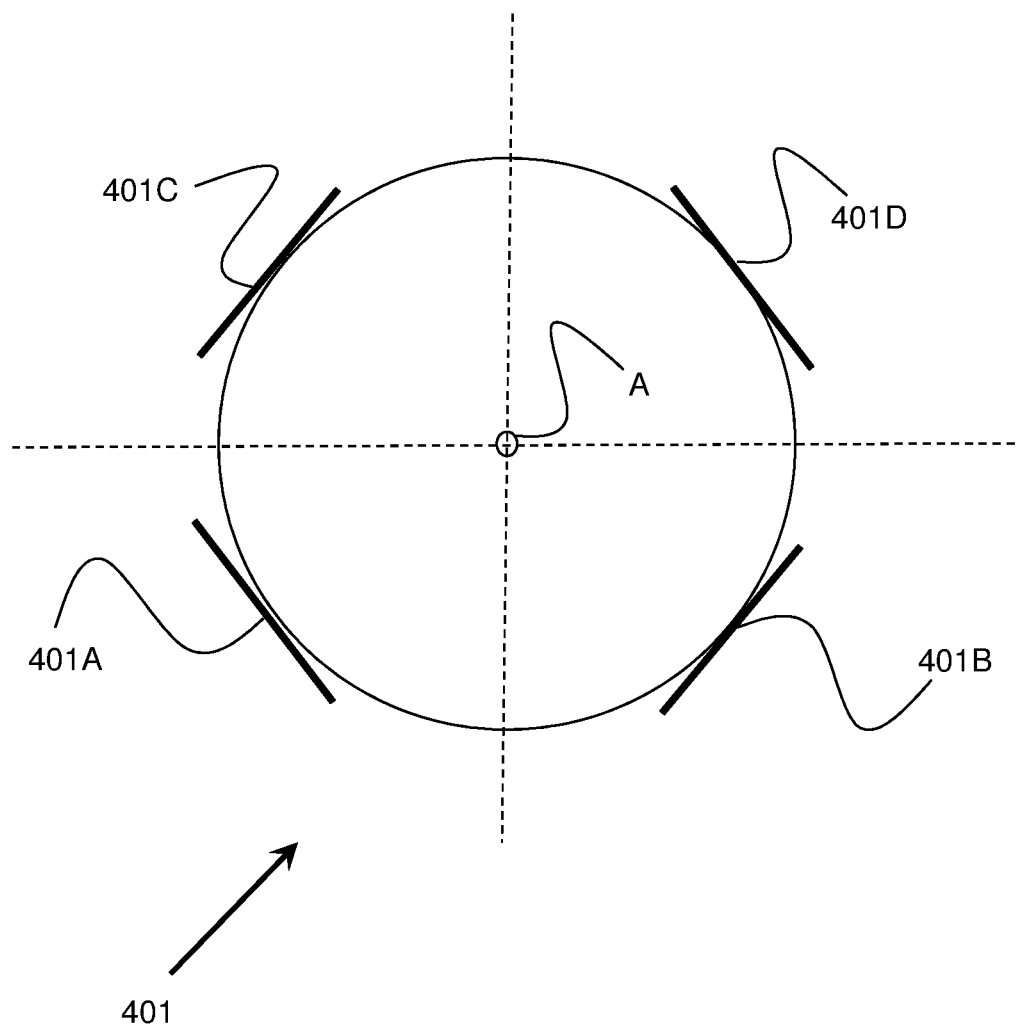
FIG. 4 depicts an illustrative embodiment of a customer assistance station (this FIG. shows a simplified plan view of the customer assistance station)

Referring now to FIG. 4, this FIG. depicts an illustrative embodiment of a customer assistance station 401 (this FIG. shows a simplified plan view of the customer assistance station). As seen, example user interface screens 401A, 401B, 401C, 401D are disposed around the perimeter of customer assistance station 401. Each of example user interface screens 401A, 401B, 401C, 401D is located in a respective quadrant of the customer assistance station 401 (as shown by the dashed lines dividing the customer assistance station 401 into quadrants relative to central axis A.

Figure 5:
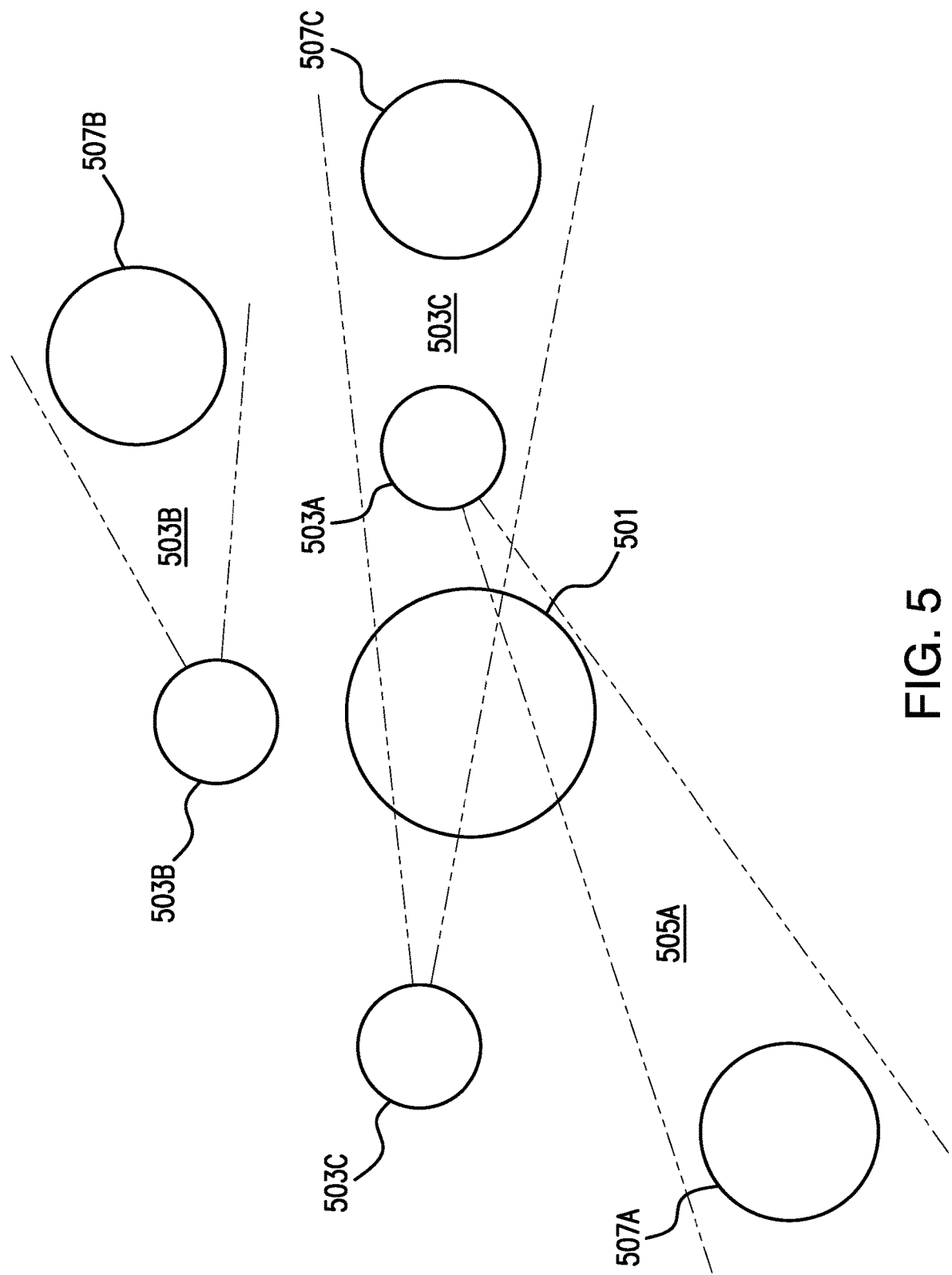
FIG. 5 depicts an illustrative embodiment of a customer assistance station (this FIG. shows a simplified plan view of the customer assistance station as well as fields of view for a plurality of users)

Referring now to FIG. 5, this FIG. depicts an illustrative embodiment of a customer assistance station 501 (this FIG. shows a simplified plan view of the customer assistance station as well as fields of view for a plurality of users). As seen, in this example, three users 503A, 503B, 503C are using customer assistance station 501. User 503A has a field of view 505A, into which is projected avatar 507A. User 503B has a field of view 505B, into which is projected avatar 507B. User 503C has a field of view 505C, into which is projected avatar 507C. The field of view of each user can be determined, for example, via image analysis of the head and/or eyes of each user to determine where each user is facing and/or looking. The determination of the field of view of each user can be dynamic in real-time and/or near real-time. Each projection (e.g., each avatar) can be moved dynamically to remain in a moving field of view of each respective user.

Figure 6:
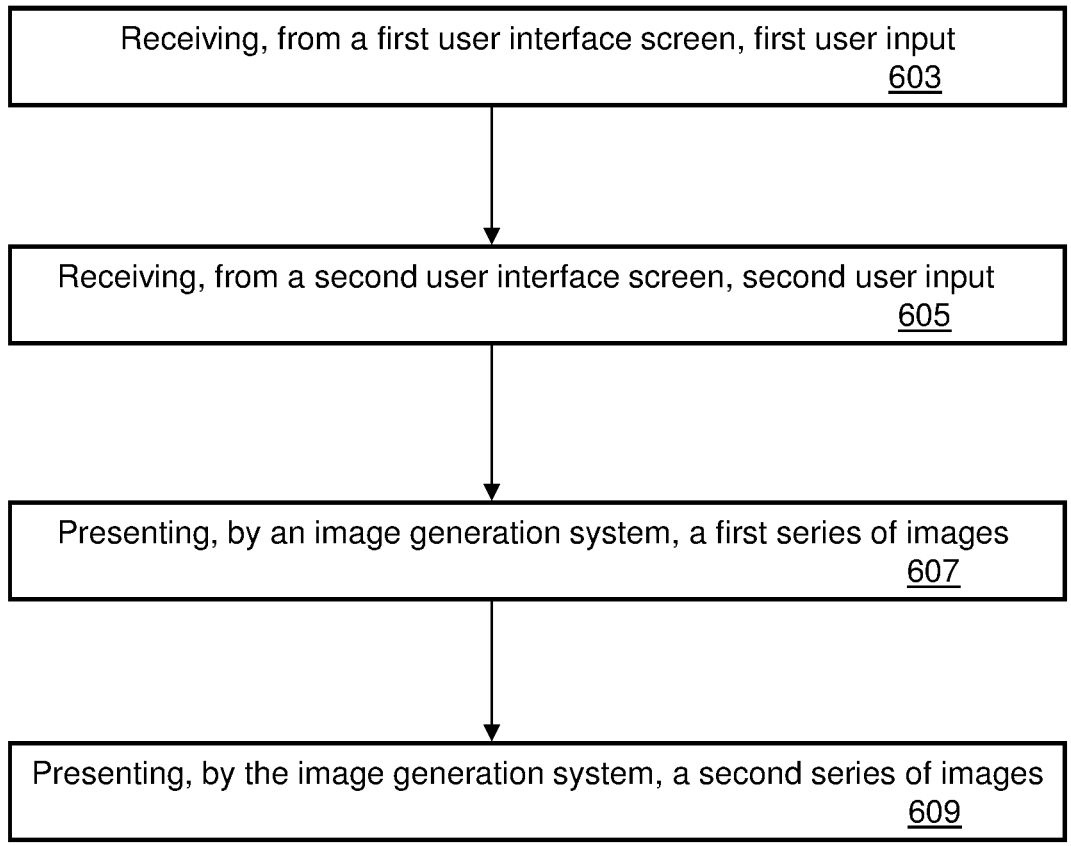
FIG. 6 depicts an illustrative embodiment of a method used in portions of the systems described in FIGS. 1-5 and 7-8.

Referring now to FIG. 6, various steps of a method 600 according to an embodiment are shown. As seen in this FIG. 6, step 603 comprises receiving, from a first user interface screen, first user input. Next, step 605 comprises receiving, from a second user interface screen, second user input, wherein the first user interface screen is disposed at a first location on a support structure that is elongated in a direction above a floor (see, e.g., FIG. 3), wherein the second user interface screen is disposed at a second location on the support structure (see, e.g., FIG. 3), wherein the first location is angularly offset from the second location relative to a vertical axis of the support structure (see, e.g., FIG. 4), wherein the first location is at a first height above the floor, wherein the second location is at a second height above the floor, and wherein the first height is greater than the second height (see, e.g., FIG. 3). Next, step 607 comprises presenting, by an image generation system, a first series of images, wherein the first series of images is presented responsive to first user input associated with the first user interface screen, and wherein the first series of images is presented as a first projection in a first volume of space. Next, step 609 comprises presenting, by the image generation system, a second series of images, wherein the second series of images is presented responsive to second user input associated with the second user interface screen, the second series of images is presented as a second projection in a second volume of space, the first volume of space and the second volume of space do not overlap (see, e.g., FIG. 5), the first volume of space is in a first field of view of a first user interacting with the first user interface screen (see, e.g., FIG. 5), and the second volume of space is in a second field of view of a second user interacting with the second user interface screen (see, e.g., FIG. 5).

In another embodiment, a method can comprise: obtaining data from at least one camera, wherein the data is indicative of the first field of view of the first user and the second field of view of the second user; utilizing the data to present the first projection in the first field of view of the first user; and utilizing the data to present the second projection in the second field of view of the second user.

While for purposes of simplicity of explanation, the respective processes are shown and described as a series of blocks in FIG. 6, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In one example, the at least one camera can comprise a first camera and a second camera; the data can comprise first data and second data; the first camera can provide the first data; the first data can be indicative of the first field of view of the first user; the second camera can provide the second data; and the second data can be indicative of the second field of view of the second user.

In another example, the first camera can be disposed in the support structure, on the support structure, remote from the support structure, or any combination thereof; and the second camera can be disposed in the support structure, on the support structure, remote from the support structure, or any combination thereof.

In another example, the first field of view of the first user can be determined from the data via first image analysis of the first viewer, wherein the first image analysis comprises determining a first direction that the first viewer is facing; and the second field of view of the second user can be determined from the data via second image analysis of the second viewer, wherein the second image analysis comprises determining a second direction that the second viewer is facing.

In another embodiment, a system comprises: a user interface to facilitate receiving user input, wherein the user interface comprises a plurality of user interface screens disposed around a pedestal structure, wherein the plurality of user interface screens comprises a first user interface screen and a second user interface screen, wherein the first user interface screen is at a first location on the pedestal structure (see, e.g., FIG. 3), wherein the second user interface screen is at a second location on the pedestal structure (see, e.g., FIG. 3), and wherein the first location is higher than the second location (see, e.g., FIG. 3); a projector to facilitate projection of a plurality of images responsive to the user input, wherein the projector presents a first image responsive to first user input associated with the first user interface screen, wherein the projector presents a second image responsive to second user input associated with the second user interface screen, wherein the first image is presented in a first field of view of a first user interacting with the first user interface screen (see, e.g., FIG. 5), and wherein the second image is presented in a second field of view of a second user interacting with the second user interface screen (see, e.g., FIG. 5).

In one example, the first user interface screen is disposed on a spherical portion of the pedestal structure at a first angle relative to a horizontal reference (see, e.g., FIG. 3), wherein the second user interface screen is disposed on the spherical portion of the pedestal structure at a second angle relative to the horizontal reference (see, e.g., FIG. 3), and wherein the first angle is different from the second angle (see, e.g., FIG. 3).

In one example, the plurality of user interface screens comprises the first user interface screen, the second user interface screen, a third user interface screen and a fourth user interface screen. In this example, the pedestal structure is elongated along a vertical axis; the pedestal structure comprises a first portion, a second portion, a third portion and a fourth portion; the first portion is located in a first angular range relative to a rotation around the vertical axis (see, e.g., FIG. 4); the second portion is located in a second angular range relative to the rotation around the vertical axis (see, e.g., FIG. 4); the third portion is located in a third angular range relative to the rotation around the vertical axis (see, e.g., FIG. 4); the fourth portion is located in a fourth angular range relative to the rotation around the vertical axis (see, e.g., FIG. 4); the first user interface screen is disposed at the first portion (see, e.g., FIG. 4); the second user interface screen is disposed at the second portion (see, e.g., FIG. 4); the third user interface screen is disposed at the third portion (see, e.g., FIG. 4); and the fourth user interface screen is disposed at the fourth portion (see, e.g., FIG. 4).

In another embodiment, a device comprises: an elongated support structure that is elongated in a direction above a floor; a first user interface screen disposed at a first location on the elongated support structure, and a second user interface screen disposed at a second location on the elongated support structure, wherein the first location is angularly offset from the second location relative to a vertical axis of the elongated support structure (see, e.g., FIG. 4), wherein the first location is at a first height above the floor, wherein the second location is at a second height above the floor, and wherein the first height is greater than the second height (see, e.g., FIG. 3); a processing system including a processor; and a memory that stores executable instructions that, when executed by the processing system, facilitate performance of operations, the operations comprising: obtaining first user input from the first user interface screen; obtaining second user input from the second user interface screen; projecting a first series of images, wherein the first series of images is projected responsive to the first user input associated with the first user interface screen; projecting a second series of images, wherein the second series of images is projected responsive to the second user input associated with the second user interface screen; wherein the first series of images is projected into a first field of view of the first user interacting with the first user interface screen (see, e.g., FIG. 5); and wherein the second series of images is presented into a second field of view of the second user interacting with the second user interface screen (see, e.g., FIG. 5).

In one example, the device further comprises at least one camera, wherein the at least one camera facilitates a first capture of a first gesture of the first user associated with the first user interface screen and wherein the at least one camera facilitates a second capture of a second gesture of the second user associated with the second user interface screen.

In one example, the at least one camera comprises a first camera that facilitates the first capture of the first gesture and a second camera that facilitates the second capture of the second gesture. In this example, the first camera is disposed in the elongated support structure, on the elongated support structure, remote from the elongated support structure, or any combination thereof; and the second camera is disposed in the elongated support structure, on the elongated support structure, remote from the elongated support structure, or any combination thereof.

Figure 7:
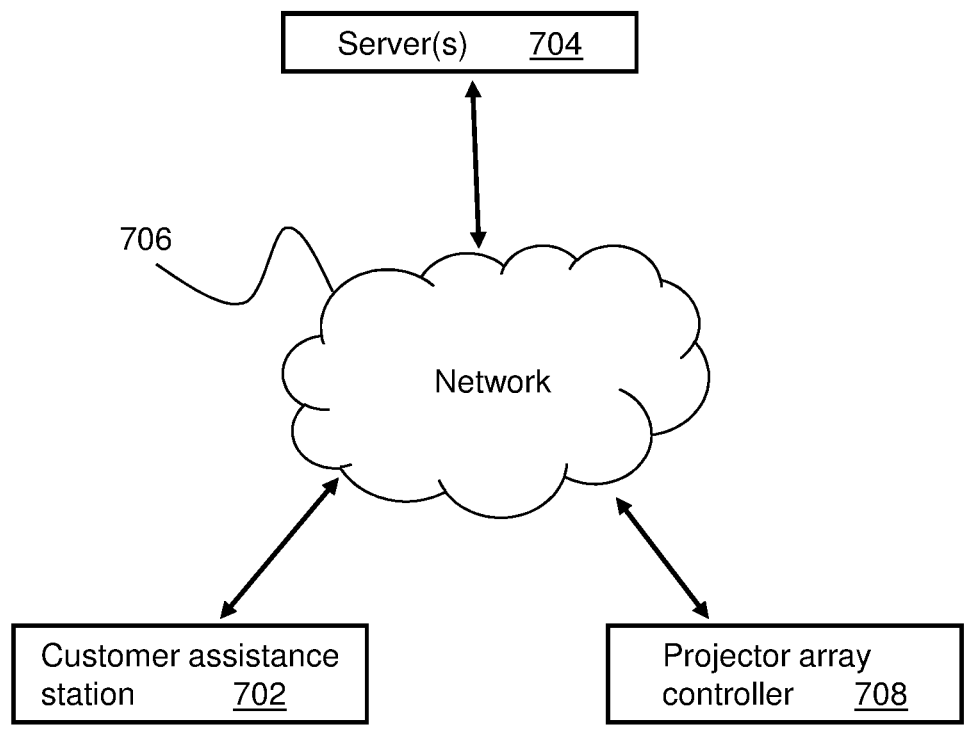
FIG. 7 depicts an illustrative embodiment of a network configuration associated with a customer assistance station.

Referring now to FIG. 7, this FIG. depicts an illustrative embodiment of a network configuration 700 associated with a customer assistance station 702 (of the type described herein). As seen, the customer assistance station 702 is in operative communication (e.g., b-directional communication) with one or more servers 704 via network 706. In addition, customer assistance station 702 is in operative communication (e.g., b-directional communication) with projector array controller 708 (of the type described herein) via network 706. In addition, projector array controller 708 is in operative communication (e.g., b-directional communication) with the one or more servers 704 via network 706. In one example, network 706 comprises the Internet. In one example, the one or more servers 704 can provide payment and/or credit processing. In another example, the one or more servers 704 can provide computational processing, such as, for image analysis. In another example, the one or more servers 704 can provide computational processing, such as, for image generation (e.g., by the projector(s)).

As described herein, various retail stores (such as that have inventory and a point-of-sale format) can benefit from utilizing various embodiments. In one example, various embodiments can be used for inventory management in distribution centers and warehouses. In another example, the light-driven customer service avatar(s) could be replaced by one or more avatars for management interaction with personnel teams.

As described herein, various embodiments can be implemented in connection with companies that sell products, have inventory and provide a mechanism for purchasing and/or interacting with customer service.

As described herein, various embodiments provide a mechanism that enables customers to interact with managed light patterns within a spatial volume as a holographic form (in one example, the holographic form is produced using an array of projectors). In various examples, the mechanism enables customers to use gesture and biometric mapping information as a method of controlling the system (e.g., controlling the system remotely). In various examples, the mechanism enables multiple customers to interact with the system to enable visual and point-of-sale interactions.

As described herein, mechanisms are provided to allow multiple customers to perform customer service activities from a single base station. In various examples, a light-driven interactive experience in a store setting is provided without the use of conventional monitors (e.g., flat monitor kiosks). In one specific example, a gesture-enabled holographic experience is provided. In one specific example, mechanisms are provided to reduce (or eliminate) the need for real physical customer service representatives (which become costly as the number of customers increase and the service queue grows).

As described herein, a customer can use biometric gestures and computer vision facial recognition as input methods for the geodesic assistant station (e.g., to initiate customer service interactions with a holographic light-representation of a human avatar in a retail store setting). In one specific example, a customer service queue can be reduced (or eliminated), thus reducing wait times in the store and improving customer flow.

As described herein, one or more projections can be provided, wherein each projection can comprise an avatar, a person, an object, or any combination thereof.

As described herein, facial identification can be utilized (e.g., to authenticate a login, to authorize a purchase, to determine where someone is looking).

As described herein, an avatar (and/or other projection) can be moved to follow where a user is looking.

As described herein, an avatar (and/or other projection) can be placed at a comfortable viewing position for a given user.

As described herein, information can be shown securely to a given user via a given user interface screen (e.g., information can be shown based on a limited angle of view). In another example, information can be shown when a user is looking at a respective user interface screen (e.g., as determined via a computer vision mechanism) and not shown when the user is not looking at the respective user interface screen (e.g., as determined via a computer vision mechanism).

As described herein, computer vision can be used to determine where a user is facing (e.g., based upon head position) and/or where a user is looking (e.g., based on eye position).

As described herein, one or more projections can be projected into one or more 3-D digital volumes.

As described herein, computer vision mechanisms can utilize joint mapping techniques (e.g., fingers, hands, etc.).

As described herein, one or more projections can be provided, wherein the projection(s) are provided via use of certain angles, brightness levels, luminosity levels, etc.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/ or wired paths that utilize one or more of various protocols or methodologies, where the coupling and/or connection can be direct (e.g., no intervening processing device) and/or indirect (e.g., an intermediary processing device such as a router).

Figure 8:
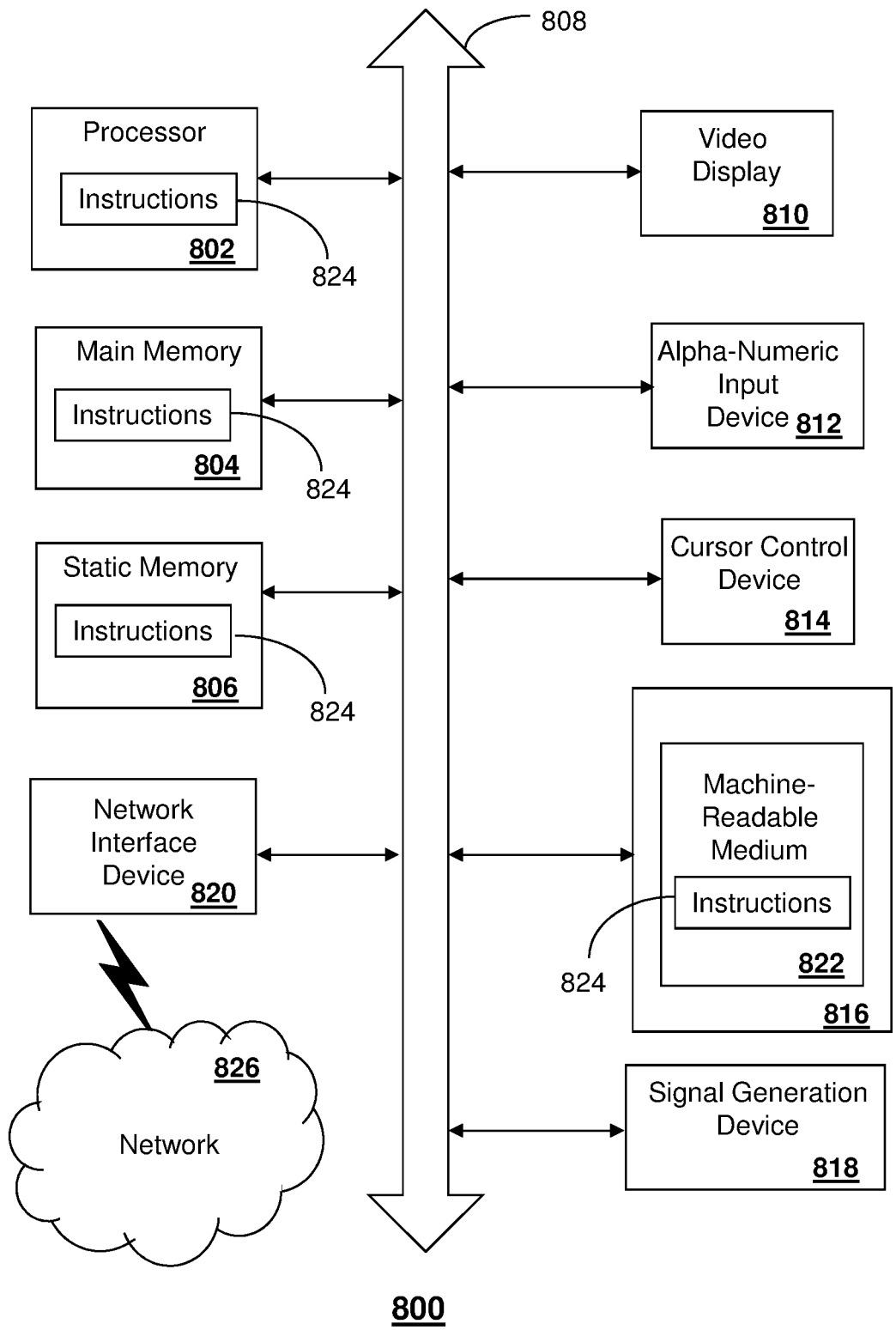
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the gateway controller discussed in connection with FIG. 1, the base station controller 105 of FIG. 1, the projector array controller 107 of FIG. 1 and/or other devices of FIGS. 1-5 and 7. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A device, comprising:
  an elongated support structure that is elongated in a direction above a floor;
  a first user interface screen disposed at a first location on the elongated support structure, and a second user interface screen disposed at a second location on the elongated support structure, wherein the first location is angularly offset from the second location relative to a vertical axis of the elongated support structure, wherein the first location is at a first height above the floor, and wherein the second location is at a second height above the floor;
  a processing system including a processor; and
  a memory that stores executable instructions that, when executed by the processing system, facilitate performance of operations, the operations comprising:
    obtaining first user input from the first user interface screen;
    obtaining second user input from the second user interface screen;

projecting a first series of images, wherein the first series of images is projected responsive to the first user input associated with the first user interface screen;

projecting a second series of images, wherein the second series of images is projected responsive to the second user input associated with the second user interface screen;

wherein the first series of images is projected into a first field of view of a first user interacting with the first user interface screen; and wherein the second series of images is projected into a second field of view of a second user interacting with the second user interface screen.

2. The device of claim 1, further comprising:

at least one camera, wherein the at least one camera facilitates a first capture of a first gesture of the first user associated with the first user interface screen, wherein the at least one camera facilitates a second capture of a second gesture of the second user associated with the second user interface screen, wherein the first capture comprises a first video capture, and wherein the second capture comprises a second video capture.

3. The device of claim 2, wherein:

the at least one camera comprises a first camera that facilitates the first capture of the first gesture and a second camera that facilitates the second capture of the second gesture;

the first camera is disposed in the elongated support structure, on the elongated support structure, remote from the elongated support structure, or any combination thereof; and the second camera is disposed in the elongated support structure, on the elongated support structure, remote from the elongated support structure, or any combination thereof.

4. The device of claim 1, wherein one of: the first height is equal to the second height, or the first height is greater than the second height.

5. The device of claim 1, wherein:

the projecting the first series of images and the projecting the second series of images is performed by a laser system;

the first series of images comprises a first 3-dimensional hologram produced by the laser system; and the second series of images comprises a second 3-dimensional hologram produced by the laser system.

6. The device of claim 1, wherein:

the first series of images comprises a first audio/video presentation of one of a first 3-dimensional representation of a first customer service representative providing customer service to the first user, a first 3-dimensional representation of a first product, or any combination thereof; and the second series of images comprises a second audio/video presentation of one of a second 3-dimensional representation of a second customer service representative providing customer service to the second user, a second 3-dimensional representation of a second product, or any combination thereof.

7. A method, comprising:

receiving, from a first user interface screen, first user input;

receiving, from a second user interface screen, second user input, wherein the first user interface screen is disposed at a first location on a support structure that is elongated in a direction above a floor, wherein the second user interface screen is disposed at a second location on the support structure, wherein the first location is angularly offset from the second location relative to a vertical axis of the support structure, wherein the first location is at a first height above the floor, and wherein the second location is at a second height above the floor;

presenting, by an image generation system, a first series of images, wherein the first series of images is presented responsive to first user input associated with the first user interface screen, and wherein the first series of images is presented as a first projection in a first volume of space; and presenting, by the image generation system, a second series of images, wherein the second series of images is presented responsive to second user input associated with the second user interface screen, wherein the second series of images is presented as a second projection in a second volume of space, wherein the first volume of space and the second volume of space do not overlap, wherein the first volume of space is in a first field of view of a first user interacting with the first user interface screen, and wherein the second volume of space is in a second field of view of a second user interacting with the second user interface screen.

8. The method of claim 7, further comprising:

obtaining data from at least one camera, wherein the data is indicative of the first field of view of the first user and the second field of view of the second user;

utilizing the data to present the first projection in the first field of view of the first user; and utilizing the data to present the second projection in the second field of view of the second user.

9. The method of claim 8, wherein:

the at least one camera comprises a first camera and a second camera;

the data comprises first data and second data;

the first camera provides the first data;

the first data is indicative of the first field of view of the first user;

the second camera provides the second data; and the second data is indicative of the second field of view of the second user.

10. The method of claim 9, wherein:

the first camera is disposed in the support structure, on the support structure, remote from the support structure, or any combination thereof;

the second camera is disposed in the support structure, on the support structure, remote from the support structure, or any combination thereof; and the first height is equal to the second height, or the first height is greater than the second height.

11. The method of claim 9, wherein:

the first field of view of the first user is determined from the data via first image analysis of the first user, wherein the first image analysis comprises determining a first direction that the first user is facing; and the second field of view of the second user is determined from the data via second image analysis of the second user, wherein the second image analysis comprises determining a second direction that the second user is facing.

12. A non-transitory machine-readable storage medium comprising executable instructions that, when executed by a system including a processor, facilitate performance of operations, the operations comprising:

receiving, from a first user interface screen, first user input;

receiving, from a second user interface screen, second user input, wherein the first user interface screen is disposed at a first location on a support structure that is elongated in a direction above a floor, wherein the second user interface screen is disposed at a second location on the support structure, wherein the first location is angularly offset from the second location relative to a vertical axis of the support structure, wherein the first location is at a first height above the floor, and wherein the second location is at a second height above the floor;

presenting, by an image generation system, a first series of images, wherein the first series of images is presented responsive to first user input associated with the first user interface screen, and wherein the first series of images is presented as a first projection in a first volume of space; and presenting, by the image generation system, a second series of images, wherein the second series of images is presented responsive to second user input associated with the second user interface screen, wherein the second series of images is presented as a second projection in a second volume of space, wherein the first volume of space and the second volume of space do not overlap, wherein the first volume of space is in a first field of view of a first user interacting with the first user interface screen, and wherein the second volume of space is in a second field of view of a second user interacting with the second user interface screen.

13. The non-transitory machine-readable storage medium of claim 12, wherein the operations further comprise:

obtaining data from at least one camera, wherein the data is indicative of the first field of view of the first user and the second field of view of the second user;

utilizing the data to present the first projection in the first field of view of the first user; and utilizing the data to present the second projection in the second field of view of the second user.

14. The non-transitory machine-readable storage medium of claim 13, wherein:

the at least one camera comprises a first camera and a second camera.

15. The non-transitory machine-readable storage medium of claim 14, wherein:

the data comprises first data and second data;

the first camera provides the first data; and the second camera provides the second data.

16. The non-transitory machine-readable storage medium of claim 15, wherein:

the first data is indicative of the first field of view of the first user; and the second data is indicative of the second field of view of the second user.

17. The non-transitory machine-readable storage medium of claim 14, wherein:

the first camera is disposed in the support structure, on the support structure, remote from the support structure, or any combination thereof;

the second camera is disposed in the support structure, on the support structure, remote from the support structure, or any combination thereof; and the first height is equal to the second height, or the first height is greater than the second height.

18. The non-transitory machine-readable storage medium of claim 13, wherein:

the first field of view of the first user is determined from the data via first image analysis of the first user; and the second field of view of the second user is determined from the data via second image analysis of the second user.

19. The non-transitory machine-readable storage medium of claim 18, wherein:

the first image analysis comprises determining a first direction that the first user is facing; and the second image analysis comprises determining a second direction that the second user is facing.

20. The non-transitory machine-readable storage medium of claim 12, wherein:

the first user interface screen comprises a first touch screen; and the second user interface screen comprises a second touch screen.

* * * * *